(12) United States Patent
Kim et al.

(10) Patent No.: US 8,682,329 B2
(45) Date of Patent: Mar. 25, 2014

(54) METHOD OF PERFORMING HANDOVER BETWEEN HETEROGENEOUS NETWORKS AND USER EQUIPMENT APPARATUS FOR THE SAME

(75) Inventors: Sunmi Kim, Seoul (KR); Jonghoon Lee, Seoul (KR); Hongku Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 30 days.

(21) Appl. No.: 13/396,528

(22) Filed: Feb. 14, 2012

(65) Prior Publication Data

US 2012/0208540 A1 Aug. 16, 2012

Related U.S. Application Data

(60) Provisional application No. 61/443,259, filed on Feb. 16, 2011.

(30) Foreign Application Priority Data

Nov. 25, 2011 (KR) .................. 10-2011-0124529

(51) Int. Cl.
*H04W 36/00* (2009.01)
(52) U.S. Cl.
USPC ........... 455/436; 455/437; 455/438; 455/442; 455/443; 455/449; 370/331; 370/332; 370/329

(58) Field of Classification Search
USPC ......... 455/436, 437, 438, 442, 443, 444, 449, 455/466; 370/331, 332, 329
See application file for complete search history.

(56) References Cited

U.S. PATENT DOCUMENTS

| 7,920,525 | B2* | 4/2011 | Kim et al. ................. 370/332 |
| 2005/0136937 | A1* | 6/2005 | Qian et al. ................. 455/452.2 |
| 2009/0168676 | A1* | 7/2009 | Olson ........................... 370/311 |
| 2010/0015977 | A1* | 1/2010 | Francalanci et al. ....... 455/435.1 |
| 2011/0201354 | A1* | 8/2011 | Park et al. ................. 455/456.1 |

* cited by examiner

*Primary Examiner* — Khai M Nguyen
(74) *Attorney, Agent, or Firm* — Lee, Hong, Degerman, Kang & Waimey

(57) ABSTRACT

A method of performing a handover between heterogeneous networks and user equipment apparatus for the same are disclosed. The user equipment apparatus includes a first type communication module configured to transceive a signal with a first type base station (BS) using a first wireless communication scheme, a second type communication module configured to transceive a signal with a second type BS using a second wireless communication scheme, and a processor configured to control the handover to be performed on a second type BS operating in an idle state with the second type communication module when a signal is received from a first type BS operating in an active state with the first type communication module, wherein the signal request that the UE performs the handover to the second type BS operating in an idle state with the second type communication module from the first type BS.

10 Claims, 8 Drawing Sheets

METHOD OF PERFORMING HANDOVER BETWEEN HETEROGENEOUS NETWORKS AND USER EQUIPMENT APPARATUS FOR THE SAME

CROSS-REFERENCE TO RELATED APPLICATIONS

Pursuant to 35 U.S.C. §119, this application claims the benefit of U.S. Provisional Application No. 61/443,259, filed on Feb. 16, 2011, and also claims the benefit of earlier filing date and right of priority to Korea Application No. 10-2011-0124529, filed on Nov. 25, 2011, the contents of which are all incorporated by reference herein in their entirety.

BACKGROUND OF THE INVENTION

1. Field of the Invention

The present invention relates to a wireless communication system, and more particularly, to a method of performing a handover between heterogeneous networks and user equipment apparatus for the same.

2. Discussion of the Related Art

First of all, handover means a function of maintaining a call status continuously in a manner that a user equipment in a call status is automatically tuned to a new call channel of a neighbor base station in the course of moving away from a corresponding base station service area (e.g., a cell boundary) into a neighbor base station service area. Since a call cutoff time in the course of switching a call channel automatically amounts to 15 ms or less, when message exchange is performed between a base station and a user equipment during such a short time, it may be difficult for a calling subscriber to detect an instant call cutoff state. As the number of user equipments is rapidly increasing due to the ongoing development of wireless communication technology, heterogeneous networks of different wireless communication schemes are expanding. Therefore, many ongoing efforts are made to research and develop the technology of handover between heterogeneous networks or media.

Handover methods may be categorized into hard handover (HHO) schemes and soft handover schemes. The soft handover schemes may be categorized into macro diversity handover (MDHO) scheme and fast base station switching (FBSS) scheme. Yet, since the soft handover scheme has a problem of excessive overhead, many ongoing efforts are made to research and develop the hard handover scheme.

Recently, the wireless mobile communication fields consistently keep being evolved in aspect of fast data transmission and reception as well as voice call. And, ongoing attentions are paid to the $4^{th}$ generation mobile communication technology, e.g., LTE (long term evolution) wireless communication system. Yet, in a current situation that the $4^{th}$ generation communication network and the commercialized $3^{rd}$ generation communication network coexist, a mobile communication terminal or a mobile communication data card should include the 3G mobile communication technology, which is already commercialized and being used globally, as well as the $4^{th}$ generation mobile communication technology. Therefore, in order to support both of the next generation mobile communication technology and the current generation mobile communication technology, a mobile terminal (hereinafter called a dual mode terminal) equipped with a dual modem processor or a data card type device (hereinafter called a dual mode terminal) equipped with a dual modem processor is required.

The dual mode terminal is equipped with two kinds of modems differing from each other in communication scheme and supports the wireless communications using the two kinds of the modems, respectively. And, the dual mode terminal is frequently used in an area in which heterogeneous communication networks coexist. For example of a representative dual mode terminal, attention is paid to a device capable of both LTE (long term evolution) wireless communication and eHRPD (enhanced high-rate packet data) wireless communication.

However, no efforts have been made to research and develop an efficient handover scheme of a terminal (or a user equipment) operating in dual mode.

SUMMARY OF THE INVENTION

Accordingly, the present invention is directed to a method of performing handover between heterogeneous networks and user equipment apparatus for the same that substantially obviate one or more problems due to limitations and disadvantages of the related art.

An object of the present invention is to provide a method for a user equipment to perform a handover between heterogeneous networks.

Another object of the present invention is to provide a user equipment apparatus for performing a handover between heterogeneous networks.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of performing a handover between heterogeneous networks in a user equipment according to the present invention may include the steps of receiving a signal from a first type base station (BS) operating in an active state with the UE, wherein the signal request UE performs the handover to a second type BS from the first type BS and performing the handover to a specific second type BS operating in an idle state with the UE among a plurality of the second type BSs based on the signal. In this case, the first type BS and the second type BS may use different wireless communication scheme, respectively.

In another aspect of the present invention, a user equipment (UE) apparatus for performing a handover between heterogeneous networks may include a first type communication module configured to transceive a signal with a first type base station (BS) using a first wireless communication scheme, a second type communication module configured to transceive a signal with a second type BS using a second wireless communication scheme, and a processor configured to control the handover to be performed on a second type BS operating in an idle state with the second type communication module when a signal is received from a first type BS operating in an active state with the first type communication module, wherein the signal request that the UE performs the handover to the second type BS operating in an idle state with the second type communication module from the first type BS. In this case, the processor performs a measurement on the at least one second type base station based on the list information if the first type communication module receives a measurement request signal including list information on at least one second type BS from the first type BS, And, the first type communication module may transmit a measurement result to the first type BS.

Accordingly, the present invention changes a band or frequency unnecessary for a user equipment in accordance with a handover performing method between heterogeneous networks and then performs a handover, thereby reducing a handover time and enhancing communication performance.

Effects obtainable from the present invention are non-limited by the above-mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes IEEE (institute of electrical and electronics engineers) 802.16 system or 3GPP ($3^{rd}$ generation partnership project) system, they are applicable to other random mobile communication systems except unique features of IEEE 802.16 system and 3GPP system.

Occasionally, to prevent the concept of the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station is a common name of such a random node of a network stage communicating with a terminal as a Node B, an eNode B, a BS (base station), an AP (access point) and the like.

In a mobile communication system, a terminal is able to receive a signal from a base station in downlink. And, the terminal is able to transmit a signal in uplink as well. Information transmitted or received by the terminal can include data and various kinds of control information. Moreover, various kinds of physical channels exist in accordance with the types and usages of the information transmitted or received by the terminal.

First of all, in the following description, E-UMTS (evolved universal mobile telecommunication system), to which the present invention is applicable, and technical features related to E-UMTS are explained.

Figure 1:
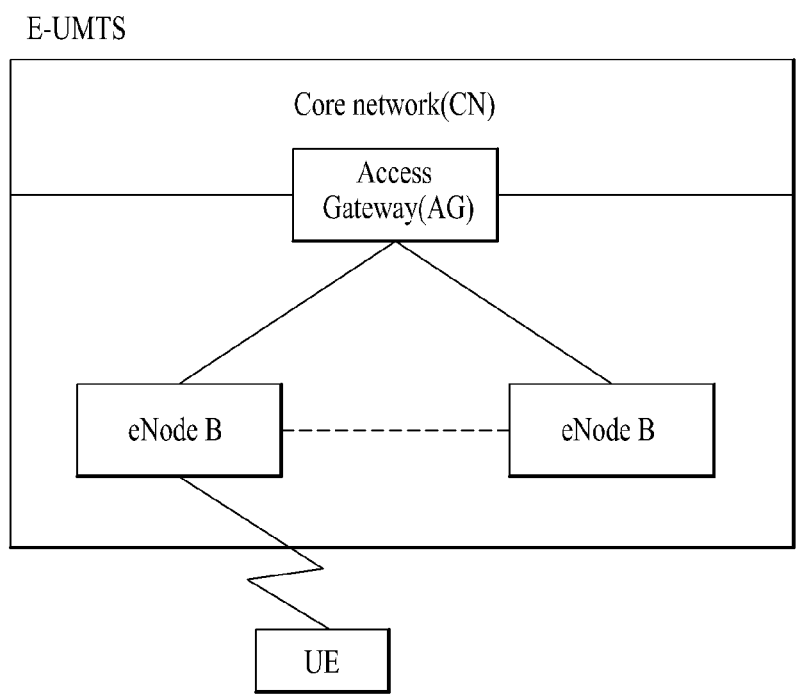
FIG. 1 is a conceptional diagram of a network structure of E-UMTS.

FIG. 1 is a conceptional diagram of a network structure of E-UMTS. First of all, E-UMTS (evolved universal mobile telecommunications system) is the system evolved from a conventional WCDMA UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

Referring to FIG. 1, E-UMTS consists of a user equipment (UE), a cell (eNode B: eNB) and an access gateway (AG) provided to an end terminal of a network (E-UTRAN) to be connected to an external network. Generally, the eNB is able to simultaneously transmit multi-data stream for a broadcast service, a multicast service and/or a unicast service.

The AG can be divided into a part in charge of a user traffic processing and a part in charge of control traffic. In particular, using a new interface, a communication can be performed between AG for a new user traffic processing and an AG for processing control traffic. The AG manages mobility of a user equipment by TA (tracking area) unit. In this case, the TA includes a plurality of cells. When a user equipment moves away from a specific TA into another TA, the user equipment informs an AG that the UE-situated TA has been changed.

A core network (CN) can consist of an AG, a network node for user registration of a user equipment and the like. And, it is able to use an interface for discerning E-UTRAN and CN from each other.

Figure 2:
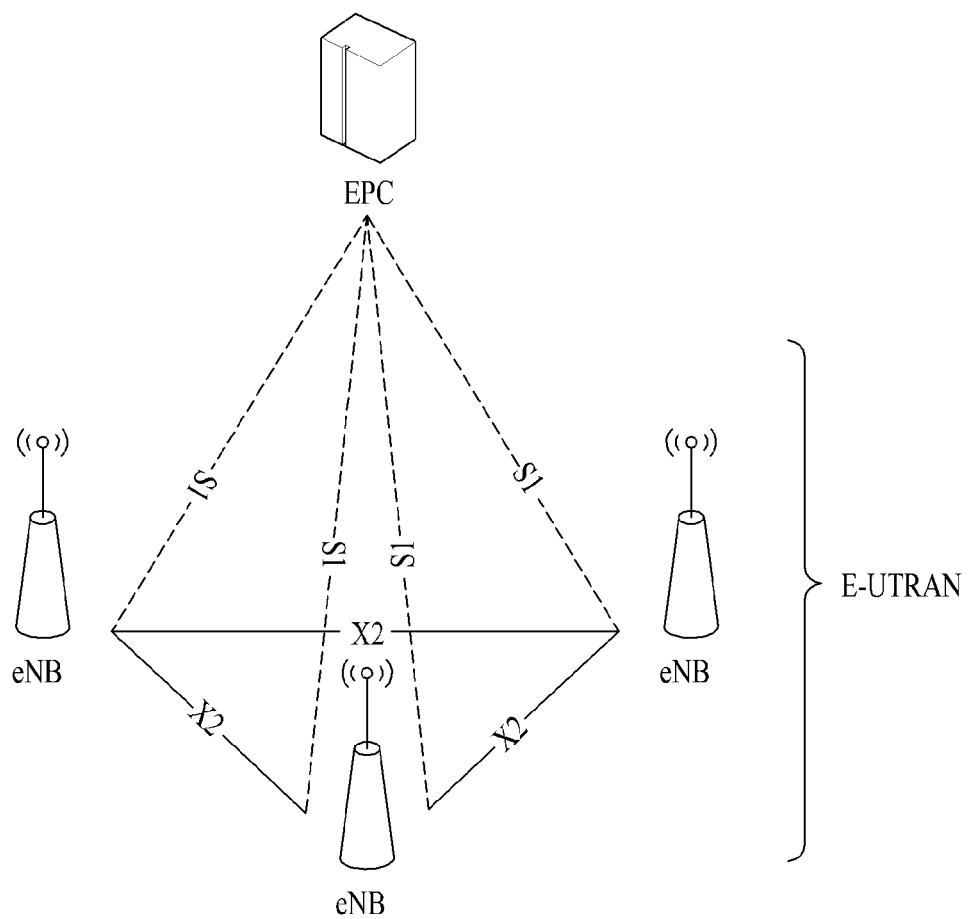
FIG. 2 is a conceptional diagram of a network structure of E-UTRAN (evolved universal terrestrial radio access network)

FIG. 2 is a conceptional diagram of a network structure of E-UTRAN (evolved universal terrestrial radio access network). In particular, the E-UTRAN system is the system evolved from a conventional UTRAN system. The E-UTRAN includes cells (e.g., eNBs). And, the cells are connected via an X2 interface with each other Each of the cell is connected to a user equipment via a radio interface and is also connected to an evolved packet core (EPC) via an S1 interface.

The EPC includes MME (Mobility Management Entity), S-GW (Serving-Gateway) and PDN-GW (Packet Data Network-Gateway). The MME has information of a user equipment or an information on capability of the user equipment. Such information is mainly used for management of mobility of the user equipment. The S-GW is a gateway having the E-UTRAN as a terminal end point. And, the PDN-GW is a gateway having a packet data network (PDN) as a terminal end point.

Figure 3:
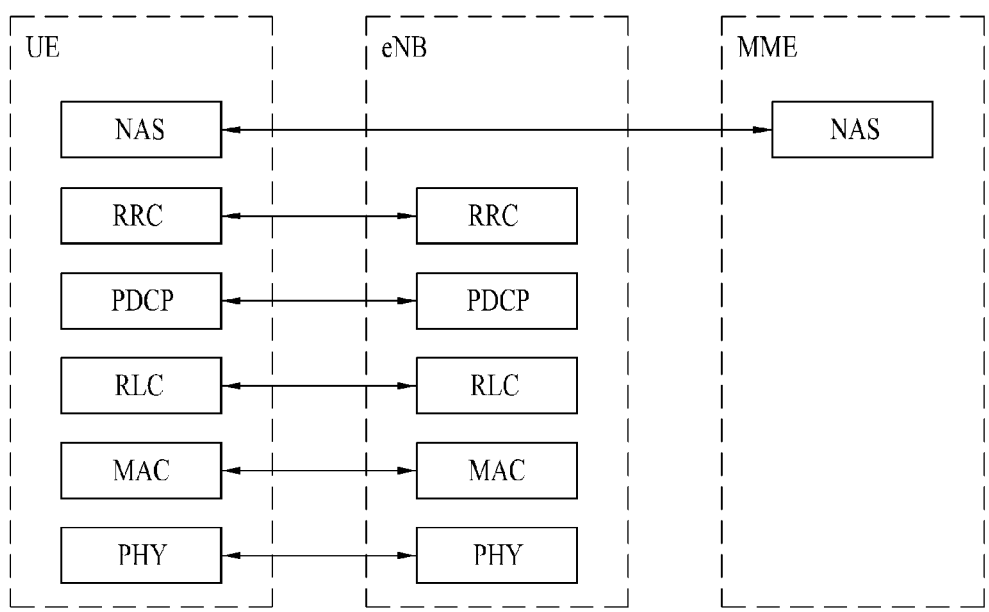
FIG. 3 and FIG. 4 are diagrams of structures of control and user planes of a radio interface protocol between a user equipment and E-UTRAN based on 3GPP radio access network specification.
Figure 4:
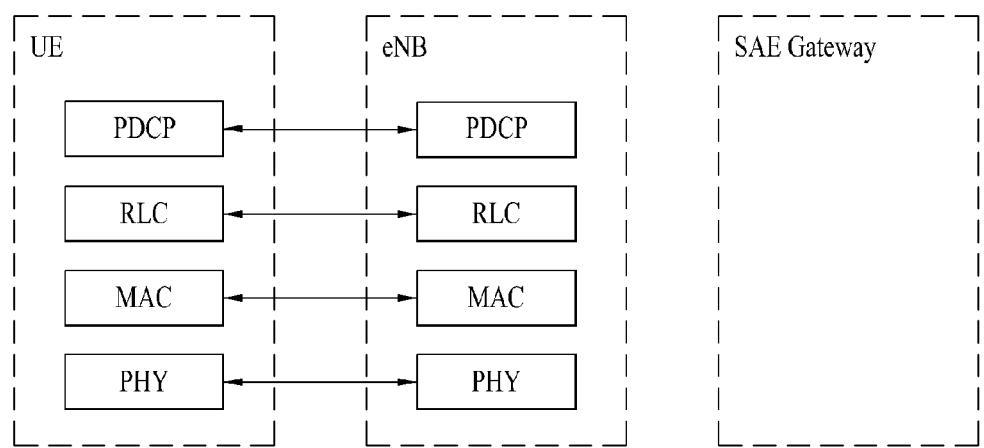

FIG. 3 and FIG. 4 are diagrams of structures of control and user planes of a radio interface protocol between a user equipment and E-UTRAN based on 3GPP radio access network specification. Referring to FIG. 3 and FIG. 4, a radio interface protocol is vertically constructed with a physical layer, a data link layer and a network layer. And, the radio interface protocol can be horizontally divided into a user plane (hereinafter abbreviated U-plane) for a data information transfer and a control plane (hereinafter abbreviated C-plane) for a delivery of a control signal (i.e., signaling).

The protocol layers shown in FIG. 3 and FIG. 4 can be divided into a first layer L1, a second layer L2 and a third layer L3 based on three lower layers of OSI (open system interconnection) reference model widely known in communication systems.

The control plane means a passage for transporting control messages used for a user equipment and a network to manage calls. And, the user plane means a passage for transporting such data generated from an application layer as voice data, internet packet data and the like. In the following description, the layers of the radio protocol control plane and the layers of the radio protocol user plane are explained.

First of all, a physical layer of the first layer provides an information transfer service to an upper layer using a physical channel. The physical layer is connected to a medium access control (MAC) layer above the physical layer via a transport channel. And, data is transported between the medium access control layer and the physical layer through the transport channel. Data is transported between a physical layer of a transmitting side and a physical layer of a receiving side through the physical channel. The physical layer is modulated by OFDM (orthogonal frequency division multiplexing) scheme and utilizes time and frequency as radio resources.

A medium access control (hereinafter abbreviated MAC) of the second layer provides a service to a radio link control layer, which is an upper layer, via a logical channel. The radio link control layer (hereinafter abbreviated RLC) of the second layer supports a reliable data transport. And, a function of the RLC layer can be implemented with a function block within the MAC layer. In this case, the RLC layer may not exist. A PDCP (packet data convergence protocol) layer of the second layer performs a header compression function for reducing unnecessary control information, to efficiently transmit such an IP packet as IPv4, IPv6 and the like in a radio interface having a narrow bandwidth.

A radio resource control (hereinafter abbreviated RRC) layer situated at the bottom of the third layer is defined in a control plane only. The RRC layer is responsible for controlling logical channels, transport channels and physical channels in association with configuration, reconfiguration and release of radio bearers (hereinafter abbreviated RBs). In this case, the RB means a service provided by the second layer for the data delivery between the UE and the E-UTRAN. For this, the RRC layers exchange RRC messages between the UE and the network.

In FIG. 3, NAS (non-access stratum) layer above the RRC layer performs such a function as session management, mobility management and the like. And, the NAS layer exists in MME (mobility management entity) of the UE and the network.

The MME is a core control-node in LTE access network. The MME is in charge of a tracking and paging process and the like for a UE in an idle mode. The MME is involved in a radio bearer activating/deactivating process and is responsible for a serving gateway (SGW) selection for a UE in case of 'Initial Attach' or an intra-LTE handover including a core network relocation. The MME is responsible for UE authentication through mutual action with a home subscriber server (HSS). NAS signaling is terminated at the MME. The MME generates a temporary identifier and then allocates the generated temporary identifier to the UE. The MME checks whether the UE has an authority for camping on PLMN (public land mobile network) of a service provider. The MME is an end point encryption/integrity protection for the NAS signaling and is in charge of security key management. And, the MME provides a control plane function for mobility between LTE and 2G/3G access network.

In the NAS layer, two kinds of states including EMM (EPS mobility management) registered state (EMM-REGISTERED) and EMM unregistered state (EMM-UNREGISTERED) are defined. And, the two states are applied to the UE and the MME. In an early stage, UE is in an EMM-unregistered state. In order for the UE to access a network, the UE performs a process for registering for a corresponding network through an 'initial attach' procedure. If the attach procedure is successfully completed, the UE and the MME are in the EMM-REGISTERED state.

In the NAS layer, two kinds of states including ECM (EPS connection management) idle state (ECM_IDLE) and ECM connected state (ECM_CONNECTED) are defined to manage a signaling connection between UE and EPC. And, the two kinds of the states are applied to UE and MME. If a UE in ECM idle state establishes RRC connection with E-UTRAN, the corresponding UE enters ECM connected state. If MME in ECM idle state establishes S1 connection with E-UTRAN, it enters ECM connected state. When UE is in ECL idle state, E-UTRAN does not have a context of the UE. Hence, the UE in the ECM idle state performs a mobility related procedure such as a cell selection procedure, a cell reselection procedure and the like without receiving a command from a network. On the contrary, if the UE is in the ECM connected state, mobility of the UE is managed in accordance with the command from the network. In case that a location of UE in ECM idle state becomes different from a location recognized by a network, the UE informs the network of its corresponding location through a TA (tracking area update) procedure.

In the following description, a handover process in such a mobile communication system as IEEE 802.16 system is explained in brief. First of all, a serving base station (SBS) is a base station that currently provides a service to a user equipment (UE). And, a target base station is a base station to which a user equipment intends to make a handover. A hard handover performs a quick handover by being synchronized with a target base station in advance to reduce a communication cutoff time in case of making a handover. For this, a user equipment may send a UE handover request message to a serving base station to make a handover. Having received the UE handover request message, the serving base station sends a handover request message to a target base station. If the serving base station receives a handover response message from the target base station, the serving base station sends a UE handover response message to the user equipment in response to the UE handover request message. The user equipment acquires information related to the target base station from the UE handover response message, prepares for a pre-process to make a handover, and then sends a UE handover indication message to the serving base station. Subsequently, the user equipment changes communication settings to be suitable for the target base station and then waits until an action time to receive a fast ranging information message (Fast_Ranging_IE) from the target base station. In this case, the fast ranging information message is the message that contains information required for the user equipment to perform a ranging process on the target base station. And, the action time is the time that is promised for the transmission of the fast ranging information message by target base station candidates for handover. Having received the fast ranging information message from the target base station, the user equipment completes its authentication through the ranging process and then resumes the communication. In order to prevent the data loss caused in the course of the communication cutoff, the user equipment, the serving base station and the target base station buffer data, transmit/receive the buffered data after successful completion of the handover, and then continue the normal communications. In particular, the user equipment starts the buffering from a timing point of sending the UE handover indication message and the serving base station starts the buffering from a timing point of receiving the UE handover indication message.

The ongoing development of the handover technology attributed to the radio communication technology development enables the support of the handover between heterogeneous networks (e.g., Inter RAT (radio access technology). Although a user equipment moves away into a different system network (or a heterogeneous network) as well as a network for which the user equipment is subscribed, this technology enables the user equipment to receive a currently used service seamlessly and continuously, thereby enhancing user's convenience.

In this specification, assume that a $1^{st}$ radio communication chip and a $2^{nd}$ radio communication chip process and transmit signals using different wireless communication scheme or different radio access technology (RAT) s, respectively. For instance, the $1^{st}$ radio communication chip may process a signal by LTE system and the $2^{nd}$ radio communication chip may process a signal by one of code division multiple access (CDMA) 1x, CDMA 1x evolution data only (EVDO), wideband code division multiple access (WCDMA), evolved high rate packet data (eHRPD) and the like, by which the present invention may be non-limited. A base station transceiving signals with a user equipment using a $1^{st}$ radio communication system (e.g., LTE) may be named a $1^{st}$ type base station. And, a base station transceiving signals with a user equipment using a $2^{nd}$ radio communication system (e.g., eHRPD) may be named a $2^{nd}$ type base station. In the present invention, a base station may be usable as a concept of including a cell or a sector.

Figure 5:
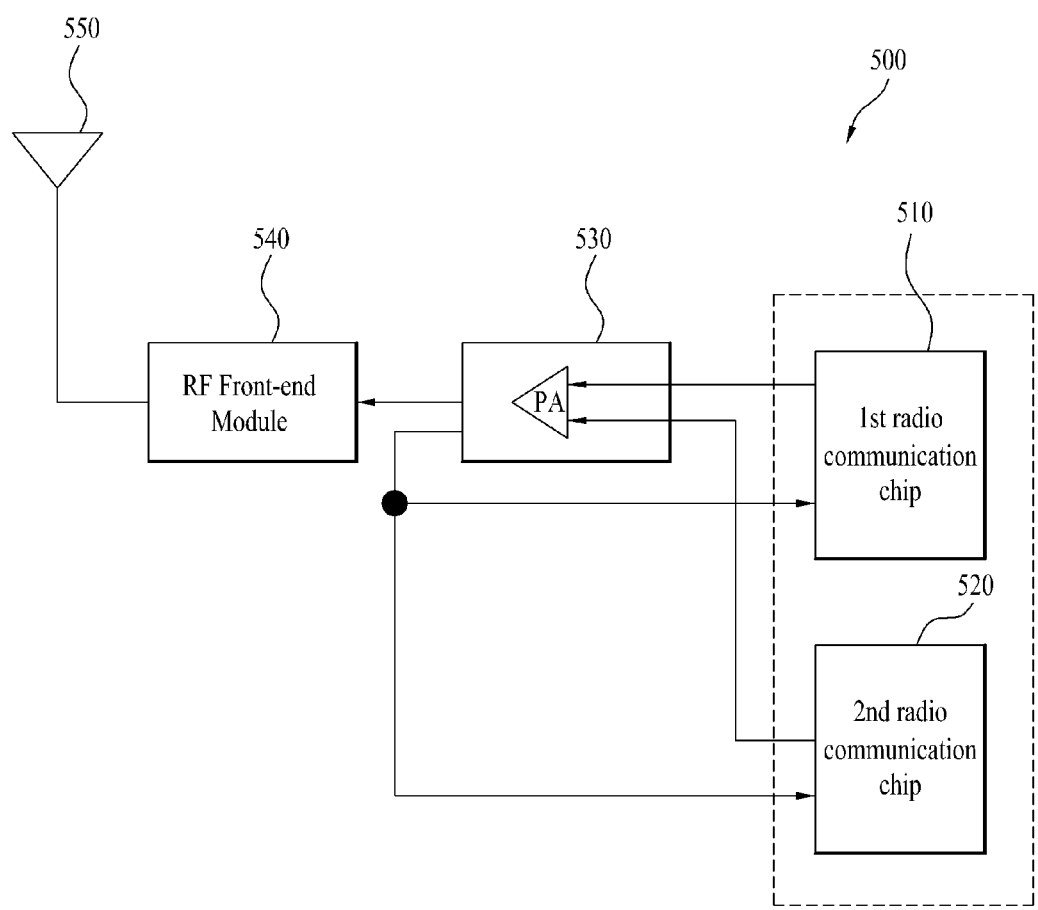
FIG. 5 is a diagram for a configuration of a user equipment apparatus 500 for performing a handover between heterogeneous networks according to the present invention.

FIG. 5 is a diagram for one example of a configuration of a user equipment (UE) 500 according to the present invention.

Referring to FIG. 5, a user equipment (UE) 500 may include a $1^{st}$ radio communication chip 510, a $2^1$ radio communication chip 520, a power amplifier 530, an RF front-end module 540 and an antenna 550.

In wireless communications, electromagnetic waves on a specific frequency band are used. Each of the $1^{st}$ and $2^{nd}$ radio communication chips 510 and 520 modulates an original signal (e.g., a baseband signal) into a signal on a high frequency band in a signal transmitting process and also demodulates a received high frequency signal into a baseband signal in a signal receiving process. Each of the radio communication chips 510 and 520 may be implemented with 'radio frequency (RF) chip' that modulates a signal processed on a baseband into a signal on a high frequency band. Alternatively, each of the radio communication chips 510 and 520 may be implemented with 'RF & baseband chip' generated from combining a baseband chip for processing a baseband signal with an RF chip for modulating a signal processed on a baseband in a signal transceiving process into a baseband signal or processing a received signal into a baseband signal by demodulating the received signal into a low frequency band signal.

The $1^{st}$ communication chip 510 and the $2^{nd}$ radio communication chip 520, as shown in FIG. 5, may be implemented into separate chips, respectively. Alternatively, the $1^{st}$ radio communication chip 510 and the $2^{nd}$ radio communication chip 520 may be implemented into one chip.

As mentioned in the above description, each of the $1^{st}$ and $2^{nd}$ radio communication chips 510 and 520 performs a modulating/demodulating function in a manner of processing an original signal into a signal on a high frequency band in a signal transmitting process and also processing a signal on a high frequency band into a signal on a baseband in a signal receiving process.

In case that the user equipment 500 needs to simultaneously transmit signals from a plurality of radio communication chips 510 and 520 having different radio communication systems applied thereto, respectively, the $1^{st}$ radio communication chip 510 performs a function of processing an original signal into a signal on a first frequency band and the $2^{nd}$ radio communication chip 520 is able to perform a function of processing the original signal into a signal on a second frequency band. In particular, the user equipment 500 may perform the signal transmitting process in a manner that a signal is modulated into different frequency band signals by the $1^{st}$ and $2^{nd}$ radio communication chips 510 and 520. In general, in case of transmitting signals transmitted by the $1^{st}$ and $2^{nd}$ radio communication chips 510 and 520 simultaneously, the user equipment 500 may be able to transmit the signals on different frequency bands, respectively.

The interface (not shown in the drawing) may be connected with components in the user equipment 500 to exchange signals and information in-between as well as the $1^{st}$ radio communication chip 510 and the $2^{nd}$ radio communication chip 520.

The power amplifier (PA) 530 may play a role in amplifying the signals received from the $1^{st}$ and $2^{nd}$ radio communication chips 510 and 520 by being processed into signals on first and second frequency bands, respectively.

The RF front-end module 540 is able to play a role in enabling free transmission and reception of the user equipment 500 and calls of the user equipment 500 in various environments. The RF front-end module 540 is able to separate transceived signals in a manner of connecting each of the $1^{st}$ and $2^{nd}$ radio communication chips 510 and 520 to the antenna 550 in the user equipment 500. The RF front-end module 540 includes a receiving stage front-end module having a built-in received signal filtering filter as a module configured to play a filtering role and a transmitting stage front-end module having a built-in power amplifier 530 for amplifying a transmission signal as a module configured to play an amplifying role. The above-configured RF front-end module 540 is mainly used for a GSM (global system for mobile communications) user equipment of TDMA (time division multiple access) which should switch transmitted and received signals by switching them to each other.

The RF front-end module 540 may be usable to transmit signals on multiple frequency bands like the user equipment 500 described in the present invention. For instance, the RF front-end module 540 enables the user equipment 500 to use both of GSM system and W-CDMA system. If the above-described RF front-end module 540 is used, it may be able to decrease the number of parts of the user equipment 500. And, it may be able to raise the reliability of the user equipment 500. Moreover, it may be able to reduce the loss due to the interconnection between the parts.

The RF front-end module 540 remarkably improves the battery consumption by reducing power consumption and also enables multiple frequency bands and downsized parts of a multi-functional user equipment. The RF front-end module 540, as shown in FIG. 5, is able to transmit the signals, which are processed on a plurality of frequency bands and then received from the power amplifier 530, via the antenna 550, respectively.

A signal is transmitted to an external environment (e.g., base station) via the antenna 550. Although FIG. 5 shows only one antenna 550, the user equipment 500 may include a plurality of antennas. The RF (radio frequency) module may be able to include the RF front-end module 540 and the antenna 550 as a module to transmit/receive signals to/from a base station and the like.

The user equipment includes the $1^{st}$ radio communication chip 510 and the $2^{nd}$ radio communication chip 520 and may work in a dual mode. In particular, if the $1^{st}$ radio communication chip 510 work in an active state of transceiving signals with a $1^{st}$ type base station (e.g., LTE network base station) using a $1^{st}$ radio communication system (e.g., LTE system), the $2^{nd}$ radio communication chip 520 may work in an idle mode with a $2^{nd}$ type base station using a $2^{nd}$ radio communication system (e.g., CDMA system). Alternatively, if the $2^{nd}$ radio communication chip 520 works in an active state of transceiving signals with a $2^{nd}$ type base station (e.g., CDMA network base station), the $1^{st}$ radio communication chip 510 may works in an idle mode with the $1^{st}$ type base station.

A method of performing a handover between heterogeneous networks (inter-RAT) according to the present invention may be described on the assumption of a case that the $1^{st}$ radio communication chip 510 works in an active state of transceiving signals with a $1^{st}$ type base station using the LTE system and that the $2^{nd}$ radio communication chip 520 works in an idle mode with a $2^{nd}$ type base station using eHRPD system.

In this case, in this idle mode, all normal operations is stopped as well as the handover and the traffic transceiving with a base station is not performed. Yet, in the idle mode, a user equipment may be able to perform pilot signal strength measurement on neighbor cells as well as a serving cell (base station) and may be able to receive system information broadcasted in predetermined interval only and a paging message which is a broadcast message. The paging message is the message that instructs a user equipment of a paging action. For instance, the paging action may include one of a ranging execution, a network re-entry and the like. Meanwhile, in the active state, a user equipment may be able to perform traffic transmission/reception to/from a base station.

Figure 6:
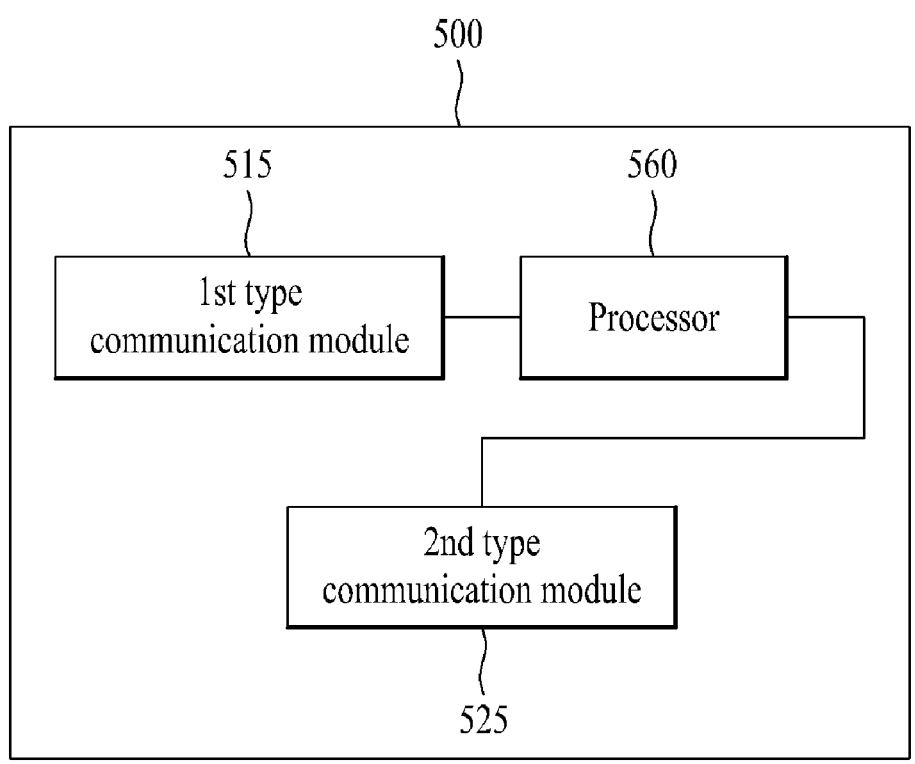
FIG. 6 is a diagram for a configuration of a user equipment apparatus 500 for performing a handover between heterogeneous networks according to the present invention.

FIG. 6 is a diagram for a configuration of a user equipment apparatus 500 for performing a handover between heterogeneous networks according to the present invention.

First of all, the configuration shown in FIG. 6 assumes a case that $1^{st}$ and $2^{nd}$ radio communication chips 510 and 520 are implemented into one integrated radio communication chip instead of separate chips. Yet, as mentioned in the foregoing description, the $1^{st}$ and $2^{nd}$ radio communication chips 510 and 520 may be implemented with separate chips, respectively.

Referring to FIG. 6, a $1^{st}$ type communication module 515 may be provided to a separate $1^{st}$ radio communication chip 510 or an integrated radio communication chip. And, a $2^{nd}$ type communication module 525 may be provided to a separate $2^{nd}$ radio communication chip 520 or the integrated radio communication chip. The $1^{st}$ type communication module 515 may be used to transceive signals with a $1^{st}$ type base station (e.g., LTE network base station) using a $1^{st}$ radio communication system and the $2^{nd}$ type communication module 525 may be used to transceive signals with a $2^{nd}$ type base station (e.g., eHRPD network base station) using a $2^{nd}$ radio communication system.

Thus, the user equipment 500 including a plurality of the radio communication chips 510 and 520 or the integrated radio communication chip capable of supporting a plurality of radio communication systems may be operable in dual mode. For instance, in case that the $1^{st}$ type communication module 515 of the user equipment 500 in an active state transceives signals with a specific $1^{st}$ type base station that is a current serving base station, the $2^{nd}$ type communication module 525 may operate in an idle mode or idle state with a $2^{nd}$ type base station. In this case, the serving base station may be able to send system information related to measurement of a user equipment to the user equipment. This system information enables the user equipment to measure base stations operating in idle mode and may instruct the user equipment to perform measurement base stations operating in idle state. In particular, this system information may be configured to enable the $1^{st}$ type communication module 515 of the user equipment 500 operating in active state to make a measurement report for $1^{st}$ type base stations. Moreover, the $2^{nd}$ type communication module 525 operating in idle state may be configured to make a measurement report for $2^{nd}$ type base stations.

After completion of the measurement, the $1^{st}$ type communication module 515 of the user equipment operating in the active state may be able to send a measurement report message to the specific $1^{st}$ type base station [hereinafter named a $1^{st}$ type base station A] that is the serving base station. In this measurement report message, channel quality information on the serving base station as the $1^{st}$ type base station and channel quality information on a neighbor cell (or a neighbor base station) may be contained. Moreover, in the measurement report message, measurement results for the $2^{nd}$ type base stations [e.g., $2^{nd}$ type base station B, $2^{nd}$ type base station C, $2^{nd}$ type base station D, etc.] operating in idle state, which are measured by the $2^{nd}$ type communication module 525 may be further contained.

The $1^{st}$ type base station as the serving base station may be able to determine whether to make a handover based on the measurement report message. If a signal strength between the user equipment 500 and the $1^{st}$ type base station A is equal to or smaller than a preset threshold (e.g., −70 dB) according to the measurement report message, the $1^{st}$ type base station A may be able to determine to make a handover to another base station. In doing so, if a signal quality between the user equipment 500 and $1^{st}$ type base stations is not better than that between the user equipment 500 and $2^{nd}$ type base stations, the $1^{st}$ type base station A may be able to determine to make a handover to a $2^{nd}$ type base station corresponding to a heterogeneous network.

The $1^{st}$ type base station A may be able to transmit a measurement request signal to the user equipment 500 together with list information on neighbor $2^{nd}$ type base stations (or $2^{nd}$ type cells). In this case, the list information may include the previously configured information on the $2^{nd}$ type base stations neighbor to the $1^{st}$ type base station A or the information configured based on the measurement report of the user equipment. T list information may include identifiers (IDs) of $2^{nd}$ type base stations (e.g., IDs of eHRPD base stations) (or cell IDs), band class, use frequency information and like that. The use frequency information of a specific $2^{nd}$ type base station may include a plurality of frequencies (e.g., 75 MHz, 200 MHz, 600 MHz, etc.). In particular, since there are a plurality of frequencies used by one base station, when user equipments access the base station, the frequency randomly determined by hashing among a plurality of the frequencies is allowed. Hence, it may be able to prevent the user equipments from being concentrated on one frequency.

A processor 560 of the user equipment 500 may be able to compare the received list information with information of a $2^{nd}$ type base station [hereinafter named a $2^{nd}$ type base station B] currently maintaining an idle state with the $2^{nd}$ type communication module 525. If an ID [i.e., $2^{nd}$ type base station B] of the $2^{nd}$ type base station currently maintaining the idle state with the $2^{nd}$ type communication module 525 is contained in the received list information, the processor 560 of the user equipment 500 may be able to perform a measurement on the $2^{nd}$ type base station B currently maintaining the idle state with the $2^{nd}$ type communication module 525 in the list information. The $1^{st}$ type communication module 515 may be able to transmit the measurement result of the $2^{nd}$ type base station B currently maintaining the idle state with the $2^{nd}$ type communication module 525 to the $1^{st}$ type base station A that is the serving base station. In doing so, the processor 560 may not compare the use frequency information contained in the list information. A plurality of frequencies exist in one base station and specific frequency are assigned to a user equipments by hashing. If a use frequency is different, a user equipment may not be able to forward the measurement information despite belonging to the same base station. Hence, the processor 560 may not compare use frequencies of the $2^{nd}$ type base stations (e.g., $2^{nd}$ type base station B, $2^{nd}$ type base station C, etc.) contained in the list information. Yet, if IDs (or cell IDs) of the $2^{nd}$ type base stations contained in the list information differ from the $2^{nd}$ type base station B currently maintaining the idle state with the $2^{nd}$ type communication module 525 in frequency only, the $1^{st}$ type communication module 515 may then transmit the measurement report including the frequency information to the $1^{st}$ type base station A.

If so, the $1^{st}$ type base station A may be able to determine to make the handover to the measurement-reported $2^{nd}$ type base station B maintaining the idle state with the $2^{nd}$ type communication module 525. Meanwhile, the $1^{st}$ type base station A may determine another $2^{nd}$ type base station C, which is not the measurement-reported $2^{nd}$ type base station B maintaining the idle state with the $2^{nd}$ type communication module 525, as a target base station to which the user equipment 500 should hand over. In this case, the $1^{st}$ type base station A may transmit a handover request signal together with band information (e.g., CDMA Band information) on the $2^{nd}$ type base station C and channel information. In particular, the $1^{st}$ type communication module 515 may receive the handover request signal together with the band information (e.g., CDMA Band information) on the $2^{nd}$ type base station C, which becomes a handover target, and the channel information from the $1^{st}$ type base station A.

Thus, if the $2^{nd}$ type base station B currently maintaining the idle state with the $2^{nd}$ type communication module 525 of the user equipment 500 is different from the $2^{nd}$ type base station C which is the base station of the cell to which the $1^{st}$ type base station A makes a request for a handover, the processor 560 may be able to control the handover to be made to the $2^{nd}$ type base station B maintaining the idle state (i.e., a currently obtained cell) despite the request made by the $1^{st}$ type base station A. As the unnecessary band or frequency of the user equipment 500 does not need to be changed, a handover time can be reduced and communication performance can be enhanced.

While the processor 560 of the user equipment 500 performs the measurement, HDR (high data rate) sleep duration operates for maximum 5.12 seconds. In 40-seconds sleep, if the $1^{st}$ type communication module 515 receives a measurement request signal (e.g., Measurement Enable Command) from the $1^{st}$ type base station A, the processor 560 may control the HDR state to be forced to wake up.

When the $1^{st}$ type communication module 515 receives the measurement request signal (e.g., Measurement Enable Command) from the $1^{st}$ type base station A, if the HDR state is the idle state, the $1^{st}$ type communication module 515 may be able to transmit the measurement result to the $1^{st}$ type base station A in case of the HDR wake-up by the sleep cycle.

Figure 7:
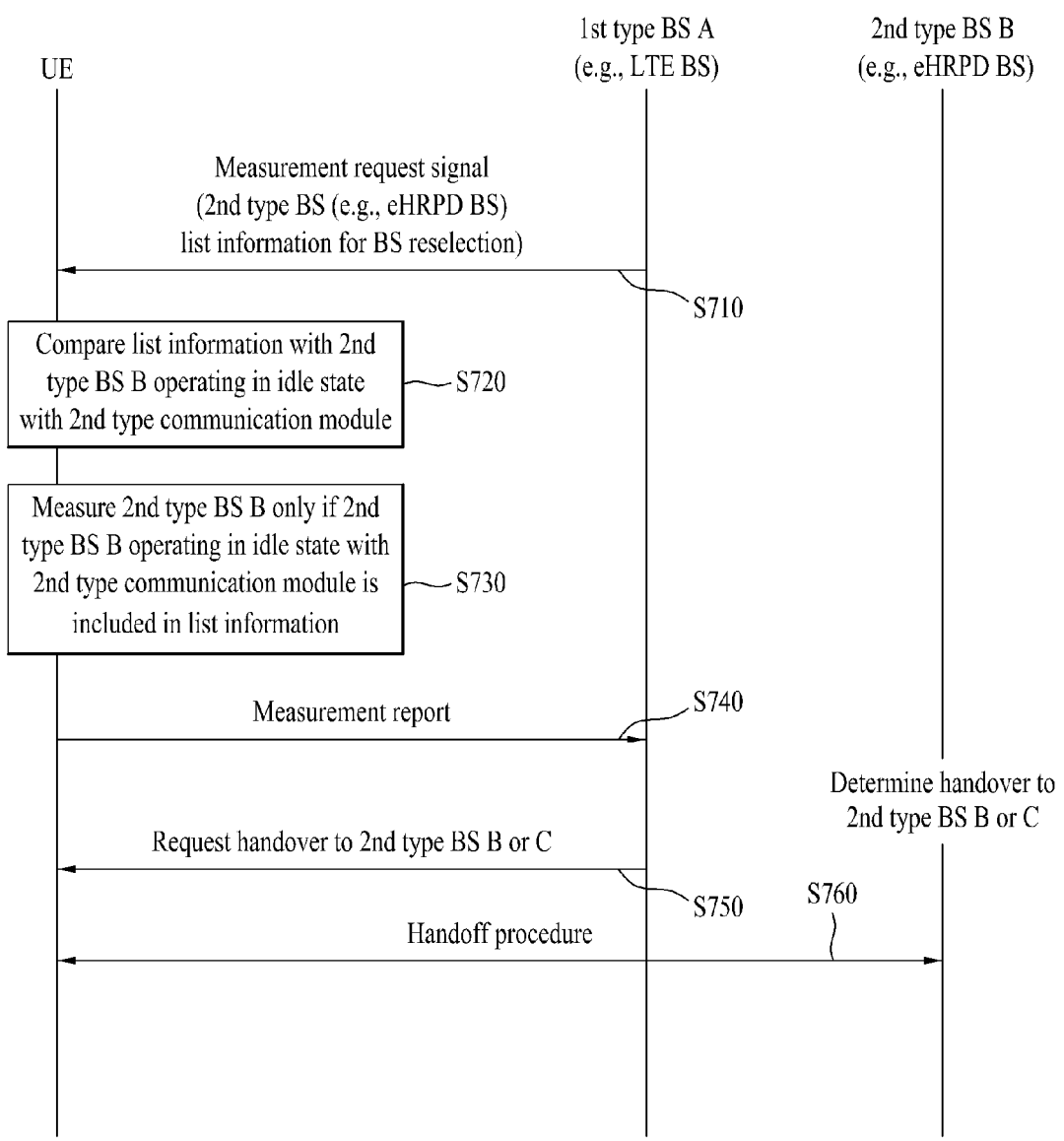
FIG. 7 is a flowchart of a process for a user equipment to perform a handover between heterogeneous networks according to a preferred embodiment of the present invention.

FIG. 7 is a flowchart of a process for a user equipment to perform a handover between heterogeneous networks according to a preferred embodiment of the present invention.

First of all, as mentioned in the foregoing description, a serving base station may be able to send system information related to a measurement of the user equipment 500 to the user equipment [not shown in FIG. 7]. In this case, the system information instructs the user equipment to perform measurement on base station operating in active state and may also instruct the user equipment 500 to perform measurement on base stations operating in idle state. In particular, this system information may be configured to enable the $1^{st}$ type communication module 515 of the user equipment 500 operating in active state to make a measurement report for $1^{st}$ type base stations. Moreover, the $2^{nd}$ type communication module 525 operating in idle state may be configured to make a measurement report for $2^{nd}$ type base stations.

After completion of the measurement, the $1^{st}$ type communication module 515 of the user equipment 500 may be able to send a measurement report for the $1^{st}$ type base station A and/or neighbor base stations to the $1^{st}$ type base station via a measurement report message or the like. In this case, the $2^{nd}$ type communication module 525 operating in the idle state may be able to forward measurement results for the $2^{nd}$ type base stations [e.g., $2^{nd}$ type base station B, $2^{nd}$ type base station C, $2^{nd}$ type base station D, etc.] to the $1^{st}$ type base station A. If a signal strength between the user equipment 500 and the $1^{st}$ type base station A is equal to or smaller than a preset threshold (e.g., −70 dB), the $1^{st}$ type base station A may be able to determine the user equipment 500 to make a handover to another base station. If a signal quality between the user equipment 500 and $1^{st}$ type base stations is not better than that between the user equipment 500 and $2^{nd}$ type base stations, the $1^{st}$ type base station A may determine to make a handover to a $2^{nd}$ type base station corresponding to a heterogeneous network.

Thereafter, the $1^{st}$ type base station A may be able to transmit a measurement request signal to the user equipment 500 together with list information on neighbor $2^{nd}$ type base stations (or $2^{nd}$ type cells) [S710]. In particular, the $1^{st}$ type communication module 515 of the user equipment 500 may be able to receive the measurement request signal including the list information on the neighbor $2^{nd}$ type base stations (or $2^{nd}$ type cells) from the $1^{st}$ type base station A (e.g., LTE base station) [S710]. In this case, the list information may include the previously configured information on the $2^{nd}$ type base stations neighbor to the $1^{st}$ type base station A or the information configured based on the measurement report of the user equipment. Yet, since the list information on the $2^{nd}$ type base stations and the measurement request can be configured in system information and can be then sent to the user equipment 500, they may be non-limited by the step S710 only. The list information on the neighbor $2^{nd}$ type base stations and the measurement request may be given as system information in advance. In this case, the list information may include identifiers (IDs) of $2^{nd}$ type base stations (or cell IDs), band class, use frequency information and the like that. The use frequency information may include a plurality of frequencies (e.g., 75 MHz, 200 MHz, 600 MHz, etc.).

Thereafter, the processor 560 of the user equipment 500 may be able to compare whether the $2^{nd}$ type base station B currently maintaining the idle sate with the $2^{nd}$ type communication module 525 of the user equipment 500 is included in the list information [S720]. If the $2^{nd}$ type base station B currently maintaining the idle sate with the $2^{nd}$ type communication module 525 of the user equipment 500 is included in the received list information, the processor 560 of the user equipment 500 may be able to perform a measurement on the $2^{nd}$ type base station B currently maintaining the idle state with the $2^{nd}$ type communication module 525 only [S730].

Subsequently, the $1^{st}$ type communication module 515 of the user equipment 500 may be able to transmit the measurement result for the $2^{nd}$ type base station B currently maintaining the idle state with the $2^{nd}$ type communication module 525 to the $1^{st}$ type base station A [S740]. Meanwhile, the processor 560 may not compare the use frequency information contained in the list information.

If so, the $1^{st}$ type base station A may be able to determine to make the handover to the measurement-reported $2^{nd}$ type base station B maintaining the idle state with the $2^{nd}$ type communication module 525 [S750]. Meanwhile, the $1^{st}$ type base station A may determine the $2^{nd}$ type base station C, which is not the measurement-reported $2^{nd}$ type base station B maintaining the idle state with the $2^{nd}$ type communication module 525, as a target base station to which the user equipment 500 should hand over The $1^{st}$ type base station A may be then bale to transmit the determination to the user equipment [S750]. Even if the $1^{st}$ type base station A determines the $2^{nd}$ type base station C as the target base station, the processor 560 of the user equipment 500 may determine the handover to the $2^{nd}$ type base station B currently maintaining the idle state with the $2^{nd}$ type communication module 525. In particular, the processor 560 of the user equipment 500 controls the handover to be made to the $2^{nd}$ type base station B maintaining the idle state with the $2^{nd}$ type communication module 525. As mentioned in the foregoing description, as the unnecessary band or frequency of the user equipment is not changed, the handover time can be reduced and the communication performance can be enhanced.

After the processor 560 of the user equipment 500 has determined to make the handover to the $2^{nd}$ type base station B, the processor 560 of the user equipment 500 performs a handover procedure to enter the $2^{nd}$ type base station C [S760]. This handover executing process of the step S760 shall be described in detail with reference to FIG. 8 later.

While the processor 560 of the user equipment 500 performs the measurement, HDR (high data rate) sleep duration operates for maximum 5.12 seconds. In 40-seconds sleep, if the $1^{st}$ type communication module 515 receives a measurement request signal (e.g., Measurement Enable Command) from the $1^{st}$ type base station A, the processor 560 may control the HDR state to be forced to wake up.

The $1^{st}$ type communication module 515 may be able to transmit a measurement result (or measurement data) to the $1^{st}$ type base station A. Moreover, when the $1^{st}$ type communication module 515 receives the measurement request signal (e.g., Measurement Enable Command) from the $1^{st}$ type base station A, if the HDR state is the idle state, the $1^{st}$ type communication module 515 may be able to transmit the measurement result to the $1^{st}$ type base station A in case of the wake-up by the sleep cycle.

Figure 8:
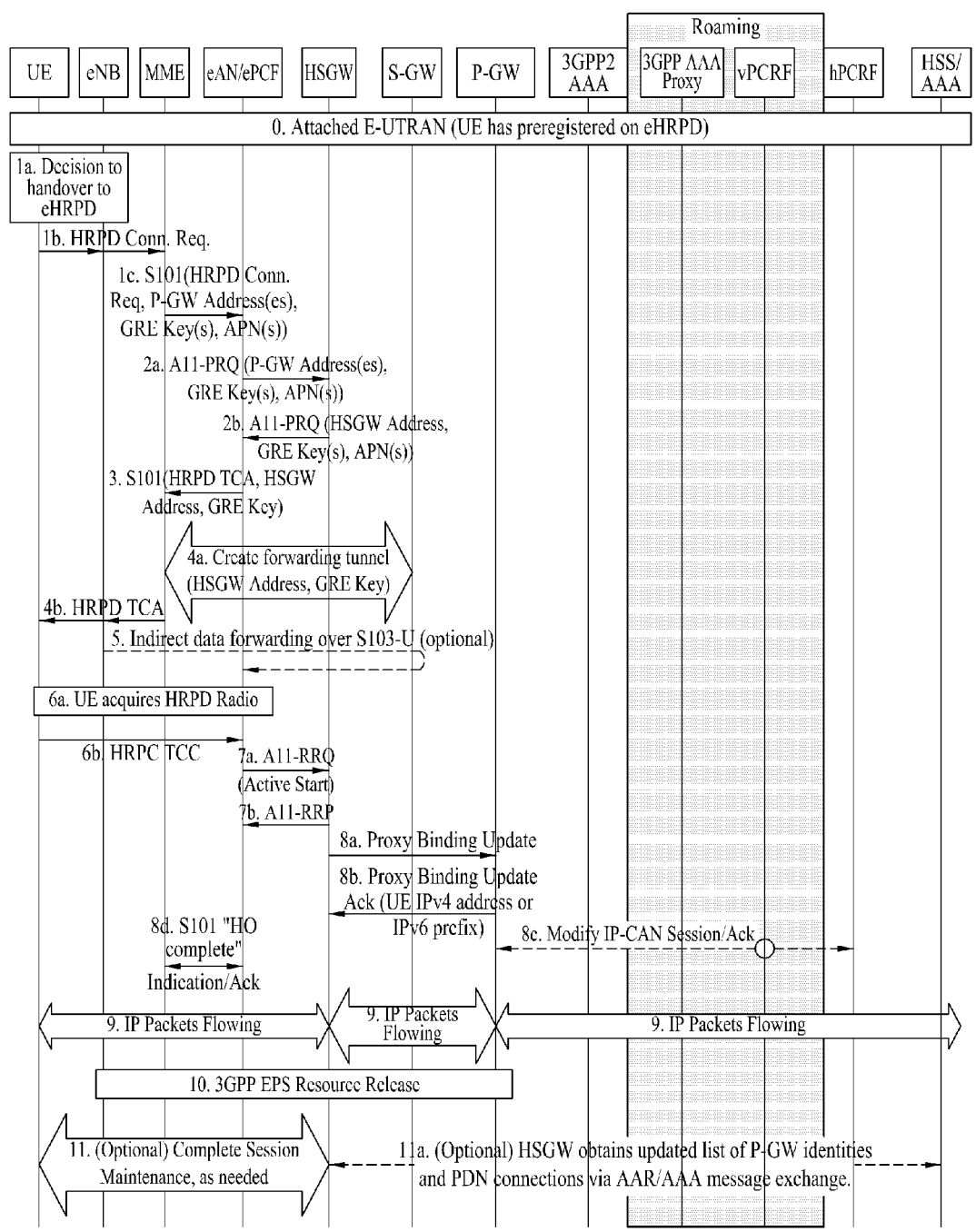
FIG. 8 is a flowchart of a detailed process for a user equipment to hand over to eHRPD base station from LTE base station according to a preferred embodiment of the present invention.

FIG. 8 is a flowchart of a detailed process for a user equipment to handover to eHRPD base station from LTE base station according to a preferred embodiment of the present invention.

Referring to FIG. 8, a user equipment (UE) may be able to determine to make a handover to an eHRPD base station from E-UTRAN (e.g., LTE base station) [indicated by '1a' in FIG. 8]. The user equipment sends HRPD connection request message for requesting HRPD connection to the LTE base station. The LTE base station then forwards the message to a mobility management entity (MME) [indicated by '1b' in FIG. 8]. The MME transmits P-GW address, related APN and uplink GRE key to an eHRPD access node together with the HRPD connection request message through S101 tunnel [indicated by '1c' in FIG. 8]. If so, eHRPD eAN/ePCF allocates a requested radio resource and then sends A 11-registration request message to HSGW [indicated by '2a' in FIG. 8]. In this message, the P-GW address, the received related uplink GRE key and an indicator, which indicates that the user equipment communicates via a tunnel, are contained by the eHRPD eAN/ePCF. In response to the A 11-registration request message from the eHRPD eAN/ePCF, the HSGW transmits a forwarding address (i.e., HSGW IP address, GRE key and related APN) to the eHRPD eAN/ePCF [indicated by '2b' in FIG. 8].

The eHRPD eAN/ePCF delivers HRPD traffic allocation (TCA) message to the MME via S101 message. This S101 message carries the HSGW IP address, GRE key and related APN for data forwarding [indicated by '3' in FIG. 8].

The MME configures a resource for indirect data forwarding and then sends the HSGW IP address and the GRE key to the S-GW. If so, the S-GW checks a data forwarding resource [indicated by '4a' in FIG. 8]. Thereafter, the MME embeds the HRPD TCA message in the S101 message and then forwards it to the E-UTRAN. This is then forwarded to the user equipment by wireless [indicated by '4b' in FIG. 8].

The E-UTRAN enables a downlink IP packet to return to the SGW via S103 interface and makes it to be sent to the HSGW. The HSGW performs a necessary processing on the IP packet and then forwards the processed IP packet to the eHRPD eAN/ePCF via A10 connection [indicated by '5' in FIG. 8].

Thereafter, the user equipment acquires eHRPD radio (i.e., L2 is attached) [indicated by '6a' in FIG. 8]. The user equipment forwards a traffic channel completion (TCC) message to the eHRPD eAN/ePCF [indicated by '6b' in FIG. 8]. The eHRPD eAN/ePCF sends A11-registration message, which carries an indicator indicating that the user equipment is now operating on eHRPD radio and an active start radio link record, to the HSGW [indicated by '7a' in FIG. 8]. The HSGW then makes a response to the eHRPD eAN/ePCF together with A11-registration response [indicated by '7b' in FIG. 8].

The HSGW and the SGW perform a proxy binding update [indicated by '8a' and '8b' in FIG. 8]. In order to confirm a handover (HO) completion, the eHRPD eAN/ePCF transmits a handover completion signal to the MME [indicated by '8d' in FIG. 8]. If the L3 attach is completed, the user equipment may transmit/receive packets to/from the eHRPD access network ['indicated by '9' in FIG. 8]. Therefore, the 3GPP EPS resource is released [indicated by '10' in FIG. 8].

As mentioned in the above description, the user equipment determines to make a handover to an eHRPD base station from LTE base station, performs a series of processes for the handover on eHRPD network, completes the handover, and then transceives data with the eHRPD network.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of performing a handover between heterogeneous networks at a user equipment (UE), the method comprising:
   receiving a measurement request signal from a first type base station (BS) operating in an active state with the UE, wherein the measurement request signal includes list information on at least one second type BS;
   performing a measurement on the at least one second type BS based on the list information, wherein the measurement is performed on a specific second type BS operating in an idle state only among the at least one second type BS when the specific second type BS operating in the idle state with the UE is included in the list information; and
   transmitting a measurement result to the first type BS,
   wherein each of the first type BS and the second type BS uses a different wireless communication scheme.

2. The method of claim 1, further comprising:
   performing the handover to the specific second type BS operating in the idle state with the UE among a plurality of second type BSs.

3. The method of claim 1, wherein the wireless communication scheme of the first type BS is long term evolution (LTE) scheme and the wireless communication scheme of the second type BS is enhanced high-rate packet data (eHRPD) scheme.

4. The method of claim 1, wherein the at least one second type BS included in the list information corresponds to a BS neighboring the UE.

5. The method of claim 1, wherein the list information includes at least band information on each of the at least one second type BS, BS identification (ID) information, or used frequency information.

6. A user equipment (UE) apparatus for performing a handover between heterogeneous networks, the UE apparatus comprising:
   a first type communication module configured to transceive a signal with a first type base station (BS) using a first wireless communication scheme;
   a second type communication module configured to transceive a signal with a second type BS using a second wireless communication scheme; and
   a processor configured to:
   perform a measurement on at least one second type base station based on list information when the first type communication module receives a measurement request signal, including the list information on the at least one second type BS, from the first type BS; and
   control the first type communication module to transmit a measurement result to the first type BS,
   wherein the measurement is performed on a specific second type BS operating in an idle state only among the at least one second type BS when the specific second type BS operating in the idle state with the UE is included in the list information.

7. The UE apparatus of claim 6, wherein the processor is further configured to control the handover to be performed on the specific second type BS operating in the idle state with the second type communication module among a plurality of second type BSs.

8. The UE apparatus of claim 6, wherein the first wireless communication scheme is a long term evolution (LTE) scheme and the second wireless communication scheme is an enhanced high-rate packet data (eHRPD) scheme.

9. The UE apparatus of claim 6, wherein the at least one second type BS included in the list information corresponds to a BS neighboring the UE.

10. The UE apparatus of claim 6, wherein the list information includes at least band information on each of the at least one second type BS, BS identification (ID) information, or used frequency information.

* * * * *